United States Patent [19]

Held, Jr.

[11] 3,837,517
[45] Sept. 24, 1974

[54] MOLECULARLY ORIENTED HOLLOW ARTICLE, SUCH AS A BOTTLE

[75] Inventor: Edward C. Held, Jr., Bartlesville, Okla.

[73] Assignee: Phillips Petroleum Company, Bartlesville, Okla.

[22] Filed: Sept. 6, 1972

[21] Appl. No.: 286,687

Related U.S. Application Data

[62] Division of Ser. No. 90,576, Nov. 18, 1970, Pat. No. 3,709,967.

[52] U.S. Cl................ 215/1 C, 156/244, 161/44, 264/89, 264/98
[51] Int. Cl.... B65d 23/00, B29c 17/04, B29b 5/04, B32b 1/04, B27c 27/00
[58] Field of Search .................. 264/89, 90, 92, 98; 215/1 C; 156/244

[56] References Cited
UNITED STATES PATENTS

| | | | |
|---|---|---|---|
| 3,106,441 | 10/1963 | Harrison | 215/1 C |
| 3,342,657 | 9/1967 | Dyer | 156/244 X |
| 3,592,885 | 7/1971 | Goins et al. | 264/98 |
| 3,651,186 | 3/1972 | Hall | 215/1 C |
| 3,662,049 | 5/1972 | Gilbert | 264/98 X |
| 3,712,497 | 1/1973 | Jones | 215/1 C |
| 3,757,978 | 9/1973 | Gilbert | 215/1 C |

*Primary Examiner*—Philip Dier

[57] ABSTRACT

Hollow articles are fabricated from two flat sheets by passing said sheets through a heating zone to heat same to orientation temperature, and thence advancing said sheets between two mold halves. The mold halves are then brought together and differential fluid pressure causes the sheets to conform to the shape of the respective mold halves, the sheets being sealed around the peripheral edges of the mold.

7 Claims, 4 Drawing Figures

MOLECULARLY ORIENTED HOLLOW ARTICLE, SUCH AS A BOTTLE

This is a divisional of application Ser. No. 90,576 filed Nov. 18, 1970 now U.S. Pat. No. 3,709,967.

BACKGROUND OF THE INVENTION

This invention relates to fabrication of oriented hollow articles from two sheets of thermoplastic material.

It is broadly known to form hollow articles from two sheets of thermoplastic material. It is also known to form oriented bottles from temperature conditioned parisons. Because of the inherent low cost of a thermoforming operation, it would be desirable to form hollow articles from two sheets in such a manner as to give strengthening orientation to the walls of the article. However, temperature which is required for orientation is too low to be ideal for forming an adequate seal as the two sheets are brought together around the peripheral edges of the mold.

SUMMARY OF THE INVENTION

It is an object of this invention to provide inexpensive oriented hollow articles; and It is a further object of this invention to form oriented hollow articles from sheet material.

In accordance with the invention, thermoplastic sheet is heated to orientation temperature, sealed around the peripheral edges of the mold, and caused to conform to the shape of the mold by differential fluid pressure.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
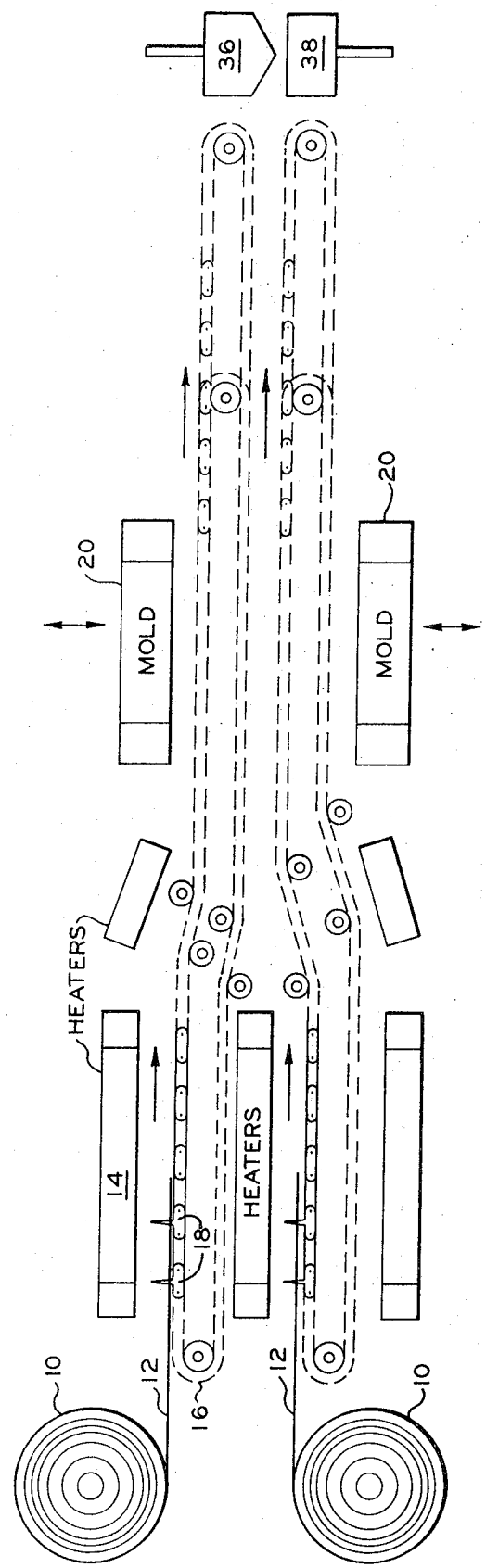
FIG. 1 is a schematic representation of an apparatus suitable for forming the hollow articles in accordance with the invention.

A disclosure of basic apparatus suitable for carrying out the invention is contained in Held, Jr., U.S. Pat. No. 3,099,043, issued July 30, 1963, and Held, Jr., U.S. Pat. No. 3,548,043, issued Dec. 15, 1970, the disclosures of which are hereby incorporated by reference.

The instant invention is applicable to forming any type of oriented hollow article and is of particular utility in forming containers such as milk bottles, oil cans, and the like.

Any orientable polymer can be used in the practice of the invention. Exemplary of such polymers are polymers of at least one mono-1-olefin having 2–8 carbon atoms per molecule, preferably polymers and copolymers of ethylene, propylene, and butene; polystyrene; poly(vinyl chloride); ABS and other butadiene/styrene-containing copolymers, particularly radial block copolymers such as are disclosed in Zelinski et al., U.S. Pat. No. 3,281,383, issued Oct. 25, 1966; styrene-acrylonitrile-containing resins including terpolymers of styrene, acrylonitrile, and methacrylonitrile; acetal resins; and the like.

The thermoplastic sheets can be extruded or otherwise formed in any manner known in the art and then reheated in the solid state to orientation temperature preparatory to use in accordance with the invention. For crystalline materials, this will generally be 1–50, preferably 10°–30°F below the crystalline melt point. For instance, for polypropylene, a temperature of 310°–330°F is suitable. The crystalline melt point can be determined by placing a small sample of the material to be tested on a heating stage of a polarizing microscope and recording the crystalline melting point as that temperature at which the last birefringence disappears on slow heating. The sheet can be heated to this temperature in an air oven, in a liquid bath, in a heating block, or by subjecting it to radiant heat or any other suitable means. Amorphous materials are generally heated to a temperature of 40°–225°, preferably 75°–150°F below the homogeneous melt temperature.

Due to the orientation occuring during fabrication due to stretching the polymer at orientation temperature, the resulting articles have improved impact strength and generally improved clarity. Bottle drop impact strength at 73°F is measured by filling ten bottles with water at 73°F and dropping them on the bottom, on the side, and at a 45° angle to the bottom. Bottles of polypropylene, for instance, made in accordance with the invention can withstand greater than a 5-foot drop, whereas bottles made by conventional blow molding or thermoforming two sheets at a high temperature at which the polymer is molten, generally fails at about 1½ feet.

An essential feature to the operability of the instant invention is achieving a seal while the two sheets are at orientation temperature. This can be accomplished by any of the following means or combinations thereof: supplying extra heat, either directly, or indirectly through working the material in the seal area and/or exerting greater mechanical pressure thereon; contacting the sheet in the area to be sealed with a member having a low thermal conductivity so as to draw away the least possible amount of heat; speeding up the closing of the mold members so that the polymer has less time to cool; and by providing a resistance to flow of the polymer away from the seal area so as to force more polymer inward into the seal area in which case the material can either be severed flush with the article being formed to give a flangeless container or severed back a short distance to give a bead around the periphery of the resulting article.

Referring now to the figures, particularly FIG. 1, there is shown rolls 10 for dispensing thermoplastic sheet 12. The sheet is conveyed through a heating zone formed by heaters 14 by means of continuous chains 16 which have gripping elements 18 which grip the edges of the sheet. The sheet is thus heated to orientation temperature and further conveyed forward and inward into position between the mold halves 20. The mold halves close on the sheets, preferably exerting just enough vacuum to billow the sheets slightly into the mold cavity so that the mold can close, sealing around the peripheral edges of the article being formed prior to general contact of the sheet with the mold surface.

In this way, there is less chilling of the sheet prior to sealing and thus a better seal is obtained. Preferably, the mold halves come together at a relatively rapid rate, for instance, at least 24 inches per second up to the last ⅛ of an inch of travel prior to closing, thus further facilitating the sealing before the sheets have cooled appreciably. The sheets are brought into final contact with the mold surfaces either through internal fluid pressure introduced by means of a blow pin positioned between the sheets or by means of a vacuum or both. Chains 16 are then advanced further after the molds open to position the web between cutting elements 36 and 38 which sever the resulting article from the web.

Preferably, both vacuum is pulled through the mold wall and fluid pressure introduced through a blow pin in order to adequately cause the plastic which is at orientation temperature to conform to the mold surface. Generally, a blow pressure of 50 to 200, preferably 75 to 150 psig is required.

The heating zone can be adapted to provide shielding so as to avoid heating the plastic in the area along the edges where the piercing clamps contact same and/or to provide extra heating in the area to be sealed. The piercing pins are preferably spaced relatively close together so as to withstand the force exerted when the molds close since the molds will preferably pull the sheets up into contact around the peripheral edges of the mold on initial contact so that any stretching which occurs as the molds continue to close occurs between the clamp and the peripheral edge of the mold in order to avoid wasted material. Since the material is at orientation temperature during this time, greater strain is placed on the conveying means.

Figure 2:
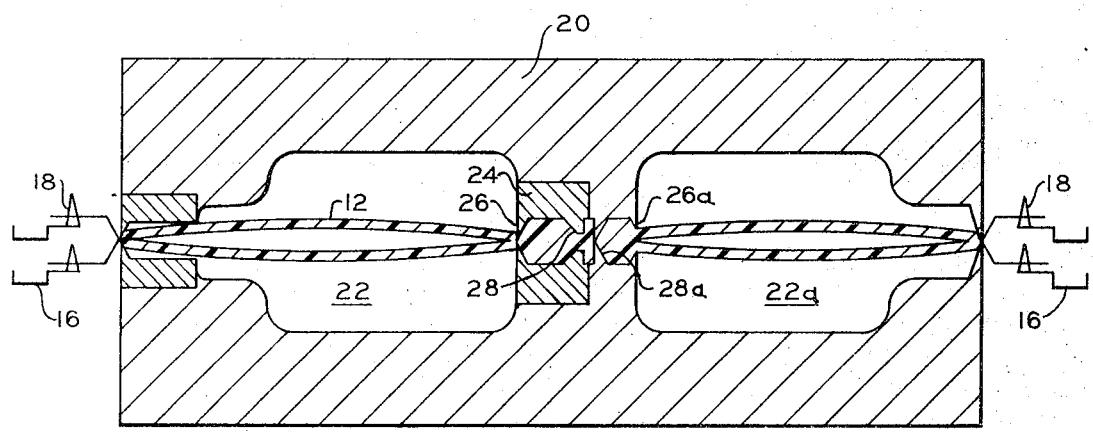
FIG. 2 is a cross-sectional view of the mold of FIG. 1.
Figure 3:
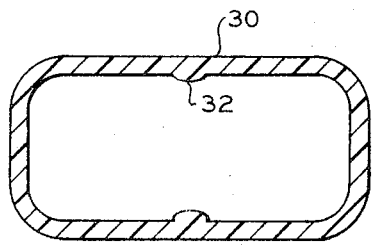
FIG. 3 is a cross-sectional view through a typical container made in accordance with the invention.
Figure 4:
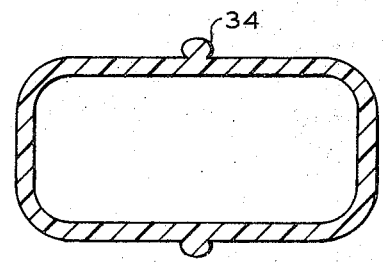
FIG. 4 is a cross-sectional view through a container made in accordance with an alternate embodiment of the invention.

Referring now to FIG. 2, there is shown in greater detail a crosssectional view of mold 20 having cavity portions 22 and 22a for forming bottles. The portion of the mold encompassing cavity 22 has an insert 24 having leading edges 26 which seal and sever sheets 12. As can be seen, insert 24 has projections 28 which serve as a means to restrict the flow of polymer in the sealed area outward from the seal, thus causing the plastic in the area being severed and sealed by leading edge 26 to flow inward toward the interior of the bottle to aid in forming a seal. Insert 24 can be made of a low thermal conductivity material so as to reduce the amount of heat carried away from the seal area, or alternatively, can be heated to provide extra heat in the seal area. It is to be noted that the configuration of insert 24 extends around the entire periphery of the article being formed. Also, the dimensions of this structure would be such that the distance between leading edge 26 and projection 28 would generally be less than that shown, this area being shown enlarged in the drawing for the purpose of clarity. Generally the distance between leading edge 26 and projection 28 would be in the order of 1/32 to ⅛ of an inch, preferably about 1/16 of an inch with the vertical dimension in this area between the two halves of member 24 being less than the combined thickness of the two sheets. Leading edge 26 forms a score line for severing the article from the surrounding web which is flush with the outer wall of the article being formed to give a flangeless seal 30 as shown in FIG. 3, with the excess material forced inward by the action of member 28 being shown by reference character 32. The mold forming cavity 22a has a slightly different configuration around the periphery thereof whereby projections 28a sever the parison a distance of about 1/32 to ⅛ of an inch from the wall thereof with leading edges 26a constricting the material adjacent the wall of the article being formed such that a bead 34 is formed around the entire periphery of the article corresponding to the seal line, as shown in FIG. 4. Thus, in both FIGS. 3 and 4, there is provided mechanical working and greater pressure in the seal area to effect a better seal.

Many conventional parts such as temperature controllers, drive motors, and the like have been omitted from the drawings for the sake of simplicity, but their inclusion is understood by those skilled in the art and is within the scope of the invention.

It is further possible in accordance with the instant invention to tailor operating conditions to the desired properties of a particular finished product. For instance, pre-oriented sheet can be used to give an article having strengthening orientation in areas which are not stretched significantly in the final forming operation. Alternatively, the sheet can be oriented in the machine just prior to forming. Also, sheet can be pre-oriented in one direction, for instance by stretching longitudinally, where the article being formed requires extra strength in that direction, the entire article receiving additional orientation during the forming operation. In all instances where preoriented sheet is used, the degree of orientation in each direction can be adjusted to the requirements of the particular finished product.

CALCULATED ILLUSTRATIVE EMBODIMENT

Propylene homopolymer having a density of 0.905 (ASTM D 1505-63T), a melt flow of 2 (ASTM D 1238-62T, Condition L), and a crystalline melt point of about 340°F is extruded into 33-mil thick sheet. Two of these sheets are fed into the heating section of an apparatus as is described in FIGS. 1–2. The upper sheet is 3.75-inches below the upper heater and 4.5-inches above the center heater. The lower sheet is 4.0-inches below the center heater and 5.0-inches above the lower heater. After the sheets have been in the heating zones long enough to heat them to a temperature of about 320°F, they are conveyed by chain conveyors, having outwardly and upwardly projecting piercing elements, forward and inward into a closely spaced relationship between two mold halves designed to produce six ½-gallon milk bottles. The mold halves are brought together and simultaneously a vacuum is pulled on each mold half. Shortly after the molds are closed, internal air pressure in introduced through blow pins positioned between the sheets. After the bottles are cooled sufficiently to be self-supporting, the molds are vented, opened, the parts ejected from the mold, and separated from the connecting sheets. Each bottle weighs approximately 45 grams. The total cycle time is 12 seconds for the production of six ½-gallon bottles. The mold has a configuration similar to that shown by cavity 22 in FIG. 2 so as to produce a clear, high-strength, hollow article from thermoplastic sheet, said article having no flange at the seal line.

While this invention has been described in detail for the purpose of illustration, it is not to be construed as limited thereby, but is intended to cover all changes and modifications within the spirit and scope thereof.

I claim:

1. A molecularly oriented hollow article having a seal line around the entire external joined edges of two contoured sheets which make up said article.

2. An article according to claim 1 wherein said article is a bottle.

3. An article according to claim 2 comprising in addition an external bead around the entire periphery of the article corresponding to said seal line.

4. An article according to claim 2 wherein said bottle is made of a polymer of at least one mono-1-olefin having 2–8 carbon atoms per molecule, said article having higher impact strength as compared with a conventionally blow molded bottle.

5. An article according to claim 2 wherein said thermoplastic material is polypropylene, said bottle having a bottle drop impact strength at room temperature of greater than 5 feet.

6. An article according to claim 2 wherein said seal is flush with an exterior surface of said article to give a flangeless seal on the outside with a line of excess material extending radially inward along the seal line.

7. An article according to claim 2 wherein said thermoplastic is a crystalline thermoplastic.

* * * * *